(12) United States Patent
Chiles et al.

(10) Patent No.: US 6,211,812 B1
(45) Date of Patent: Apr. 3, 2001

(54) QUIET RADAR METHOD AND APPARATUS

(75) Inventors: William H. Chiles, Mishawaka; Kenneth Raymond Moser, South Bend, both of IN (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 06/448,455

(22) Filed: Dec. 10, 1982

(51) Int. Cl.[7] .................................................. G01S 13/08
(52) U.S. Cl. .............................. 342/145; 392/13; 392/82; 392/120
(58) Field of Search ........................ 343/12 R, 12 A, 343/14, 17.5, 18 R, 18 E; 244/3.19; 342/145, 13, 82, 120; 455/296

(56) References Cited

U.S. PATENT DOCUMENTS

| | | | |
|---|---|---|---|
| 3,187,330 | * | 6/1965 | Boles et al. ............................ 343/14 |
| 3,641,573 | * | 2/1972 | Albanese ............................ 343/12 R |
| 3,774,206 | * | 11/1973 | Rauch ................................ 343/12 A |
| 3,830,567 | * | 8/1974 | Riegl .................................. 343/7.5 X |
| 3,860,925 | * | 1/1975 | Darboven, Jr. ...................... 343/12 A |
| 4,045,796 | * | 8/1977 | Kline, Jr. ............................. 343/12 R |

* cited by examiner

Primary Examiner—John B. Sotomayor
(74) Attorney, Agent, or Firm—Loria B. Yeadon

(57) ABSTRACT

A random signal radar unit transmits a variable signal modulated by random noise (at 35). The return signal from the target area is correlated (at 61) with a sample of the transmitted signal, effectively compressing the spread spectrum waveform into a narrow band signal. The result is a covert high resolution radar which can be instrumented to operate in a number of single-or multi-mode configurations. By randomly varying biphase modulation (at 41, 35) and by, modulating (at 49) the echo signal with the modulation delayed by a time equivalent to that of a leakage delay, a random signal is produced (at 35, 39) in which leakage return signals are readily filtered (at 53, 59).

10 Claims, 2 Drawing Sheets

QUIET RADAR METHOD AND APPARATUS

BACKGROUND OF THE INVENTION

This invention relates to a radar device which transmits a signal which is varied in frequency and modulated in order to avoid detection, avoid the possibility of "smart" jamming if detected and in order to reduce power requirements of the output signal. Typically, such radar devices are used as quiet altimeters for unmanned aircraft having a terrain following capability, as well as other terrain following aircraft. Quiet altimeters are also useful for other applications, including altitude sensors and non-military aircraft.

A radar altimeter, in a simple form, transmits pulses of radar energy, with ranging information being obtained in the classical manner by measuring a delay time of an echo signal. In order to provide a continuous wave transmission, the transmitted signal must be modulated and the delay in modulation be somehow measured. For example, an FM radar frequency modulates the transmitted signal and measures the frequency shift of the echo in order to obtain range information. The continuous transmission also creates considerable noise, including noise resulting from transmitter leakage signals during echo reception. In order to overcome these noises, a substantial output must be employed and appropriate filters.

In military operations, the radar signal not only provides an enemy with information concerning the existence of a source of a transmitted signal but also may enable the enemy to provide false information in the form of imitation echo signals. For this reason, various methods are used to reduce the power output of radar altimeters and to introduce random or pseudo-random patterns to the radar-transmitted signal. One of the problems with random and pseudo-random signals is that the echo signals no longer fall within a very narrow frequency range, making it difficult for a receiver to be designed only for receiving signals at a desired frequency. In order to eliminate spurious signals, elaborate filtering techniques are required. The transmitted signal must therefore have sufficient amplitude to overcome problems caused by spurious signals being received. In a continuous wave radar transmission, a leakage signal occurs, usually between the transmitting and receiving antenna. This leakage signal must be filtered out or otherwise ignored in order to process the desired echo signals. In randomly modulated radar, the means to filter or ignore leakage signals becomes increasingly complex. Again, the receiver requirements imposed by a need to filter leakage signals tends to increase the transmitted power necessary to insure proper reception.

In unmanned aircraft applications, as well as in most other applications, various terrain is likely to be encountered. This results in varying requirements for power output in order that the altimeter's radar can "read" the terrain. Variations in the power requirements also exist as a result of differences in mean altitude. This means that a radar altimeter need not transmit a predetermined maximum amount of power during all times of its operation.

It is accordingly an object of the present invention to provide a radar altimeter which is capable of producing a randomly modulated output and which operates at a minimum power level. It is a further object to provide for a means for interpreting the echos of such an altimeter by referring to the modulation of the transmitted signal. It is a further object to include a means for eliminating as many spurious signals from the received echos as possible by utilizing the above-mentioned means for interpreting the echos as a part of a filter circuit. It is a further object to provide a randomly modulated radar altimeter which simply and accurately selects a proper return signal in order that a transmitted signal may be provided at a low power output. It is a further object to provide an altimeter which is able to adjust its power output in accordance with the minimum power required for adequate reception of radar signals during the particular circumstance of operation.

SUMMARY OF THE INVENTION

This invention contemplates a radar system for effecting range and speed measurements, as for an altimeter, in which a radio frequency (RF) signal is randomly modulated by a biphase modulator in order to be transmitted. The echos from the transmitted radio frequency signals are received and are down-mixed with a signal representing an anticipated leakage. The down-mixed signal is then mixed with a frequency-shifted replica of the radio frequency oscillator's output, thereby providing an output of an offset frequency. The offset frequency is compared to the modulation of the transmitted output, as delayed by a delay means. The delay means is adjusted so as to provide a peak coincidence between the offset frequency and the modulation of the modulated output, thereby providing an indication of the time delay of received echo signals.

DETAILED DESCRIPTION OF THE PREFERRED EMBODIMENTS

Figure 1:
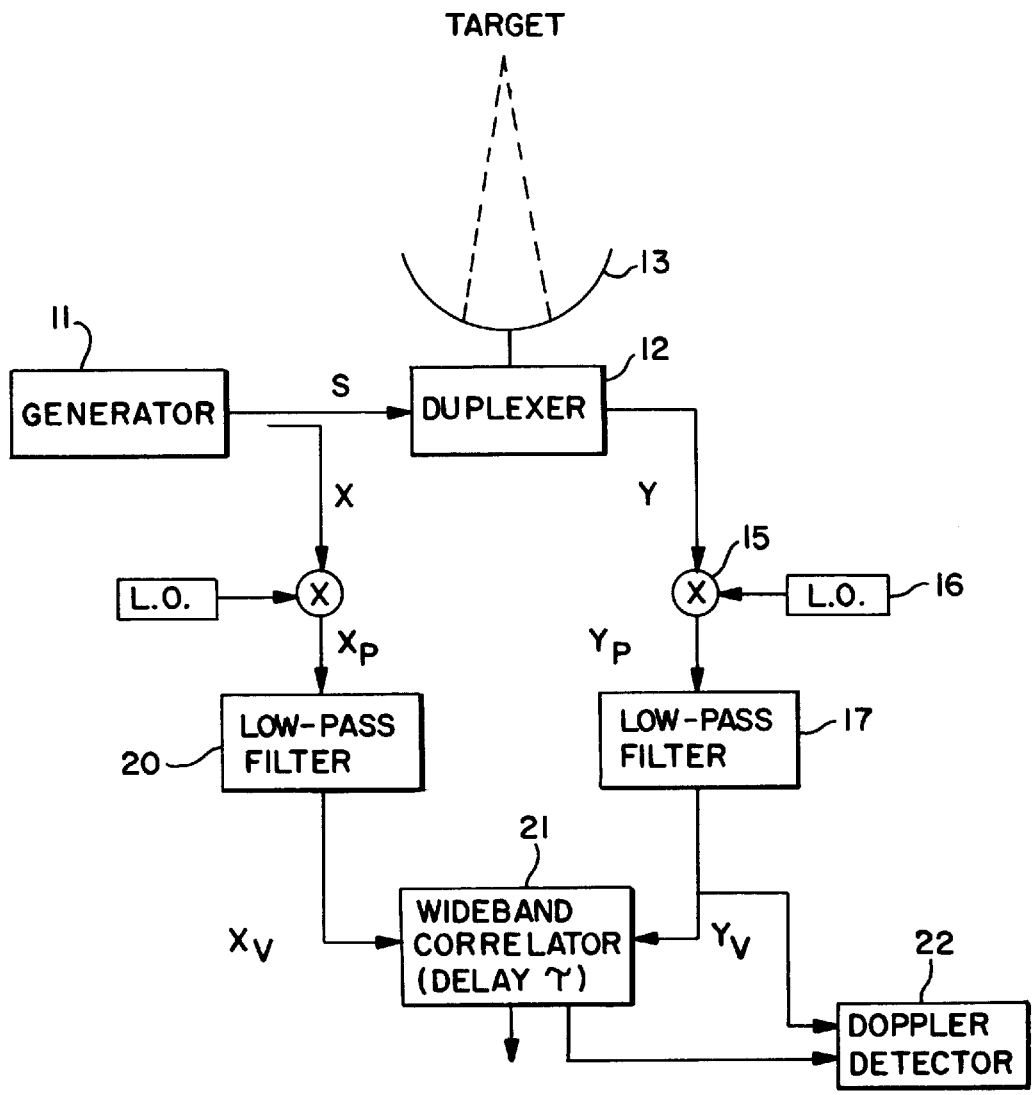
FIG. 1 is a block diagram showing the function of a random signal radar constructed according to the invention.

Referring to FIG. 1, a random signal radar transceiver transmits a random signal S which is generated by generator 11. The signal S generated by generator 11 is transmitted through a duplexer 12 and transceiver antenna 13 and is reflected off of a target in a conventional fashion. The reflected signal is received through the antenna 13 and is output from the duplexer 12 as a target-reflected signal Y. A receiver mixer 15 down-converts a target reflected signal Y with a signal from an oscillator 16 in order to obtain a down-converted signal $Y_P$ which is, in turn, filtered at filter 17. This produces a filtered downbeat target reflected signal $Y_V$ which represents the signal received from the target.

A sample portion X of the signal S from the generator 11 is used to compare with the target reflected signal Y (represented by the filtered downbeat target reflected signal $Y_V$). That portion X is mixed at a second mixer 18 with a signal from a second local oscillator 19 in order to produce a downbeat sample signal $X_P$. The downbeat sample signal $X_P$ is filtered at filter 20 in order to produce a filtered downbeat sample signal $X_V$ to be used as reference signal. The filtered downbeat target reflected signal $Y_V$ is therefore a replica of the reference $X_V$, as delayed by the round trip return of the echo signal from the target. By selectively delaying the reference signal, the reference signal $X_V$ and its time-delayed replica $Y_V$ can be multiplied and integrated and the resultant output peaked. The delay time of peak coincidence should equal the delay in the reception of the echo signal at the duplexer 12.

The reference signal $X_V$ is delayed and compared with signal $Y_V$ in wide band correlator 21. The correlator 21 is used to find a delay time which results in the peak coincidence between signals $X_V$ and $Y_V$. When the delay of the correlator 21 is equal to the round trip target delay of the echo signals, the correlator output will be at a maximum. As the correlator's delay is varied in either direction from the target delay, the output of the correlator 21 is reduced. For a given reference delay, the output of the correlator 21 can be any value between zero and maximum, with the exact value depending on the phase relationship between reference and replica signals $X_V$, $Y_V$. If there is relative radar-target motion, the target reflected frequency Y is shifted relative to the reference frequency X and consequently the frequency of signal $Y_V$ will be frequency shifted relative to frequency $X_V$ at a doppler frequency. Thus, the relative motion produces an output from the correlator 21 at the doppler frequency and can be used to measure relative motion.

Covertness can be achieved in a random signal radar by spreading the transmission of the signal as generated by signal generator 11 over a wide band width and transmitting a low average power. The random nature of wide band transmission prevents "code" detection and correlation by the enemies ELINT (electronic intelligence) equipment. The influence of jamming signals and clutter type returns is limited by the system's natural tendency of suppressing the effects of return signals not modulated by the system. Coherent summation beyond the resolution element of the radar is not possible. Those reflections originating from points outside the resolution elements are, to the radar, the same as any other interferer, that is, they are suppressed by the equivalent of the system's processing gain.

Figure 2:
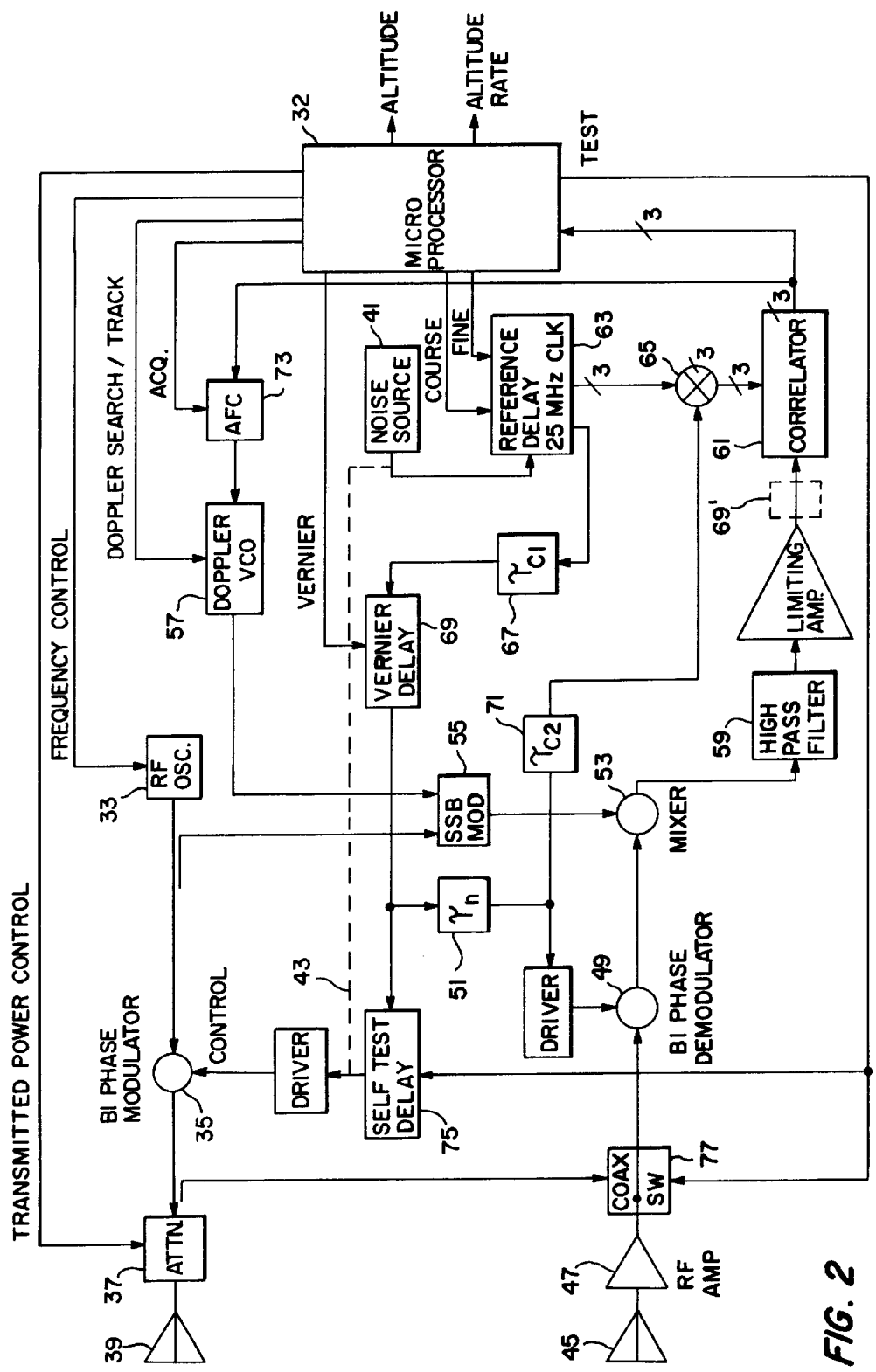
FIG. 2 is a schematic block diagram showing a random signal radar transceiver being used as a quiet altimeter.

FIG. 2 shows a typical implementation of the random signal radar, such as may be used in a radar altimeter. The altimeter is controlled by a microprocessor 32 which includes, among its outputs, a frequency control signal. The frequency control signal is applied to a radio frequency (RF) oscillator 33 in order to control the output frequency of the oscillator. A biphase modulator 35 modulates the signal from the oscillator 33 in two phases, 180 degrees apart. The biphase modulated signal is, in the preferred embodiment, provided at a full power level and is attenuated by a controllable attenuator 37 before being transmitted through a transmitting antenna 39. Attenuator 37 is controlled by a transmitted power control signal from the microprocessor 32 in accordance with minimum power requirements for the altimeter to operate over the particular terrain and under the particular conditions prevailing at the time of operation, as determined by the clarity of an altitude signal received by the microprocessor 32.

A noise source 41 is used to control the biphase modulation of the transmitted signal by providing a control signal to the biphase modulator 35. In the preferred embodiment, the control signal to the biphase modulator 35 is delayed somewhat, prior to receipt from the noise source 41, although the signal from the noise source 41 is effectively transmitted to the biphase modulator 35 as indicated by dashed line 43.

Echo signals are received through receiving antenna 45 and amplified by a radio frequency amplifier 47 which functions as a receiver. It is expected that a leakage signal will be present at the amplifier's 47 output as a result of the transmitted signal leaking directly from the transmitting antenna 39 to the receiving antenna 45. The amplified signal from the radio frequency amplifier 47 is compound modulated in first mixer 49 in accordance with the control signal from the noise source as delayed by a delay time T The delay time $\tau_n$ is a calculated or empirical value of a delay in receiving the leakage signal and is therefore an anticipated leakage signal. Thus, the signal from the first mixer 49 has total phase modulation, resulting from the leakage signal, reduced to near zero. The delay time is maintained by a leakage delay circuit 51 which synthetically matches the leakage delay in the anticipated leakage signal.

The signal from the first mixer 49 is mixed at a second mixer 53 with a signal at the frequency generated by the oscillator 33 modulated by a single sideband modulator 55. The single sideband modulator 55 creates a sideband from the transmission frequency generated by oscillator 33 as modulated by a voltage controlled oscillator 57. The output of single sideband modulator 55 is therefore offset by a fixed amount from the frequency of oscillator 33 in order to produce an output within a predetermined frequency range and in order to reduce the leakage signal as modulated by the first mixer 49 to a low frequency, or ideally, D.C. The leakage signal component of the output of the second mixer 53 is removed by a high pass filter 59, with the remaining signal being transmitted to a correlator 61.

A variable reference delay circuit 63 provides a series of 3 mixers 65 with three delayed signals from the noise source 41, representing early, median and late delay steps. The reference delay circuit 63 delays a digital signal (in this case the control signal from the noise source 41) by sampling the signal and storing the samples in a memory (not shown). After a predetermined time equal to the desired signal delay, the samples are read out of the memory to recreate the digital signal. The digital signal to be delayed is periodically sampled at a rate which preserves the intelligence of the signal. These periodic samples are stored in a shift register (not shown) to form a binary word of a predetermined length. As each binary word is assembled, the completed binary word is transferred to a first buffer store (not shown) in which it is held briefly before it is stored in the memory. Timing circuitry and logic circuitry in the form of a multiplexer (not shown) causes the previously stored binary words to be read out of the memory one by one and temporarily stored in a second buffer store (not shown). The individual binary bits of the binary word stored in the second buffer storage are read out by the logic circuitry at the same rate at which they were originally sampled to recreate the original but at the predetermined delay. The variable reference delay circuit 63 is described in detail in U.S. Pat. No. 6,388,057 (Jun. 14, 1982), now U.S. Pat. No. 4,506,348 hereby incorporated by reference.

As mentioned before, the control signal to the biphase modulator 35 is delayed prior to modulation. This occurs because the signal from the noise source 41 is first obtained from a first output bit of the reference delay circuit 63, then delayed in a first constant delay circuit 67 and then in a vernier delay circuit 69. The delayed signal from the vernier delay circuit 69 controls the biphase modulator 35 in normal operation.

The signal from the vernier delay circuit 69 is then delayed by the leakage delay circuit 51 and by a second constant delay circuit 71. The signal from the second constant delay circuit 71 is provided to the delay mixers 65. The leakage delay circuit 51 and the second constant delay circuit 71 delay a mixing signal at the delay mixer 65 by an amount equal to $\tau_{c2}$ plus the leakage delay, $\tau_n$, beyond the delay in the control signal to the biphase modulator 35. The relationship of the signal received by the receiver 47 with the early, median and late signals to the delay mixers 65 is unaffected by the first constant delay circuit 67 and the vernier delay circuit 69 which effect a delay in the biphase modulation of the transmitted signal. Therefore, these delay circuits 67, 69 effectively reduce the delay time of the outputs of the delay mixers 65 as seen by the correlator 61. The delay mixers 65 provide early, median and late mixed signals to the correlator 61 so that the correlator 61 can compare the return signal with the early, median and late signals from the delay mixers 65. The correlator 61 uses exclusive-OR gates and low pass filters to provide integrator outputs representative of early, median and late delays to the microprocessor 32. The microprocessor 32 can then evaluate the integrator outputs to determine what the median delay should be so that the correlator 61 will maximize the output representative of the median delay. The microprocessor 32 then adjusts the reference delay 63 in coarse time adjustments in order to determine the appropriate median delay time which, when providing a maximum coincidence with the output of the high pass filter 59 at the correlator 61, represents the round trip delay time of a radar signal to the target.

The difference in delay time represented by the early and late delay signals is necessarily very coarse in order that the information can be useful in allowing the microprocessor 32 to rapidly adjust the delay times generated by the reference delay circuit 63. Therefore, even a fine adjustment of the reference delay 63 results in a significant change in the altitude read. For this reason, the vernier delay circuit 69 is used to effect an even finer adjustment of the median delay time. The vernier delay circuit delays the signal from the noise source 41 prior to the control of the biphase modulator 35. The effect of this is equivalent to delaying the signal from the high pass filter 59 to the correlator 61. Since the vernier delay circuit 69 is not located between the delay outputs from the reference delay circuit 63 to the correlator 61, the vernier delay 69 has the (inverse) effect of being inserted before the correlator as indicated by box 69'; however, since the control signal to the biphase modulator 35 is easier to process, the vernier delay 69 is located along that signal path.

The output signal of the correlator 61 is processed by a discriminator circuit 73 which senses any doppler shift which results from a vertical velocity component between the vehicle and the ground. The sensed error is used as an automatic frequency control signal to control the voltage controlled oscillator 57 and therefore maintains the signal's doppler spectrum within a predetermined band width.

In order to self-test the altimeter, an imitation delayed echo signal is inserted into the system. In accomplishing this, the delay is inserted, in response to a test signal, into the modulation control signal by a switchable test delay circuit 75. This switchable delay circuit 75 is outside of the control loop for the delay mixers 65 and therefore only affects the echo signals. A coaxial test switch 77 is simultaneously activated to draw the signal from the output of the biphase modulator 35 in order to eliminate signal transmission factors from the test measurement. This test procedure verifies whether each of the delay circuits, as well as the microprocessor 32 is properly functioning with respect to the proper delay times as compared to the delay time of the switchable test delay circuit.

While a phase modulated altimeter has been described in detail, the random signal radar according to this invention can also be a frequency modulated type. However, the FM radar has greater processing loss than the biphase modulated radar.

It is anticipated that numerous modifications can be made to the described invention in accordance with the specific purpose of the random signal radar. For example, it is possible to use more delay outputs from the reference delay that has been described. As has been described with reference to dashed line 43 and the alternate location 69 of the vernier delay box, it is also possible to locate various components of the circuit at various locations within the circuitry while remaining within the scope of the invention. While the invention has been described in connection with an aircraft altimeter, it is contemplated that the invention may be useful for other purposes such as for land vehicles. The random nature of the signal would be beneficial in an automobile's anti-collision system because signals generated by transmitters in other vehicles will not be "read" as echos by the system. Accordingly, the invention should be read only as limited by the claims.

What is claimed is:

1. Radar apparatus characterized by:
   a) means for providing a first modulated signal and for transmitting said signal;
   b) means for receiving an echo signal corresponding to the transmitted modulated signal, and responsive to said echo signal for providing a signal which includes a modulated echo component and a modulated leakage component;
   c) means for providing a signal corresponding to an anticipated modulation of the leakage component;
   d) time delay means for providing a time delayed signal representative of the transmitted signal and delayed by a variable amount of time;
   e) second modulated signal means including a first receiving mixer and connected to the echo signal receiving means and to the anticipated modulation means and responsive to the modulated echo component and the modulated leakage component of the signals from the echo signal receiving means for providing a second modulated signal;
   f) return signal means including a second receiving mixer connected to the second modulated signal means and to the time delay means and responsive to the signal therefrom for providing a return signal corresponding to the modulation of the modulated echo component, wherein the time delay means delays the signal representation of the transmitted signal prior to being provided to the second receiving mixer;
   g) the time delay means providing a signal representative of the modulation of the transmitted signal which thereby corresponds to the first modulated signal which is delayed by a variable interval; and
   h) means connected to the time delay means and to the return signal means for varying the interval of the delay of the signal representative of the modulation of the transmitted signal to provide a time delayed signal to match the return signal with the time delayed signal.

2. Apparatus as described by claim 1, further characterized by:
   a) means for providing a noise signal;
   b) the means for providing a first modulated signal including means for providing a signal at a carrier frequency;
   c) modulating means connected to the noise signal means and to the carrier frequency signal means for modulating the carrier frequency signal in accordance with the noise signal to provide said first modulated signal; and
   d) the time delay means being connected to the means for providing the noise signal for providing the signal corresponding to the first modulated signal.

3. Apparatus as described by claim 2, further characterized by:
   the carrier frequency being modulated so that said carrier frequency has two phases, whereby the first modulated signal is a biphase modulated signal.

4. Apparatus as described by claim 3, further characterized by:

the two phases of modulation being substantially 180 degrees apart.

5. Apparatus as described by claim 1, further characterized by the signal transmitting means including means for providing a carrier signal and means for phase modulating the carrier signal into two phases, whereby the first modulated signal is a biphase modulated signal.

6. Apparatus as described by claim 1, further characterized by:

a) the signal transmitting means including a frequency source providing a carrier frequency and means for modulating the carrier frequency to provide the first modulated signal;

b) means to provide a signal having a frequency offset relative to the frequency of the carrier signal by an amount equal to a doppler shift in the modulated echo component; and c) the means providing a return signal corresponding to the modulation of a modulated echo component being connected to the frequency offset signal means so that the offset frequency is used to provide said return signal.

7. Apparatus as described by claim 5, further characterized by the signal transmitting means transmitting the signal at a frequency and means to provide a signal at a frequency of the transmitted signal offset by a doppler shift in the modulated echo component, the demodulating means mixing the modulated output from the receiving means with the offset signal to provide its converted output.

8. Apparatus as claimed in claim 1, further characterized by:

a) a modulation source providing a modulation signal;

b) the signal transmitting means being connected to the modulation source and providing the first modulated signal in response to the modulation signal;

c) the anticipated modulation means providing the anticipated modulation of the leakage component by providing a delayed signal from the modulation source; and d) the signal demodulating means being connected to the anticipated modulation signal means.

9. Apparatus as claimed in claim 1, further characterized by output power control means connected to the transmission means for controlling output power in accordance with an amount of power necessary for the system to obtain range measurements.

10. Method for obtaining range information, characterized by:

a) providing a first modulated signal and transmitting said signal;

b) receiving echo signals corresponding to the transmitted modulated signal, and responding to said echo signals by providing a response signal which includes a modulated echo component and a modulated leakage component;

c) providing an anticipated modulation signal which includes an anticipated leakage signal delay component;

d) varying the interval to match the return signal with the time delayed signal to provide an anticipated delay signal;

e) modulating the anticipated delay signal to provide a signal corresponding to the first modulated signal which is delayed by a variable interval;

f) modulating the response signal with the anticipated modulation signal to provide a second modulated signal in response to the modulated echo component and the modulated leakage component; and g) modulating the second modulated signal to provide a return signal corresponding to the modulation of the modulated echo component in response to the second modulated signal.

* * * * *